United States Patent [19]

Kuzmick et al.

[11] Patent Number: 5,082,365
[45] Date of Patent: Jan. 21, 1992

[54] REMOTE IDENTIFICATION AND SPEED DETERMINATION SYSTEM

[76] Inventors: Kenneth F. Kuzmick, 1001 Blackwood St., Altamonte Springs, Fla. 32701; Robert A. Kuzmick, Rt. 3, 116 Whiskey Creek Rd., Hollywood, Md. 20636; William J. Davis, 4901 Woodruff Springs Rd., Sanford, Fla. 32771

[21] Appl. No.: 458,417

[22] Filed: Dec. 28, 1989

[51] Int. Cl.[5] .................... G01P 3/36; G01B 11/00
[52] U.S. Cl. ...................... 356/28; 356/390; 356/394; 356/4
[58] Field of Search ................. 356/1, 4, 28, 390, 394

[56] References Cited

U.S. PATENT DOCUMENTS

| | | |
|---|---|---|
| 3,553,437 | 1/1971 | Boothroyd . |
| 3,801,775 | 4/1974 | Acker . |
| 3,868,634 | 2/1975 | Dolch . |
| 3,909,787 | 9/1975 | Laurer et al. . |
| 4,195,425 | 4/1980 | Leitz et al. ................ 356/28 |
| 4,257,703 | 3/1981 | Goodrich ................... 356/4 |
| 4,329,574 | 5/1982 | Jordan, Jr. . |
| 4,567,609 | 1/1986 | Metcalf . |
| 4,603,390 | 7/1986 | Mehdipour et al. . |
| 4,658,147 | 4/1987 | Eldering . |
| 4,728,784 | 3/1988 | Stewart . |
| 4,774,571 | 9/1988 | Mehdipour et al. . |
| 4,776,464 | 10/1988 | Miller et al. . |
| 4,787,739 | 11/1988 | Gregory ..................... 356/390 |
| 4,817,166 | 3/1989 | Gonzalez et al. . |

Primary Examiner—Stephen C. Buczinski
Attorney, Agent, or Firm—Kenneth E. Jacobs

[57] ABSTRACT

A remote object/vehicle identification and speed determination system including a bar code label on each object/vehicle and a device for continuously scanning an area to determine when the object/vehicle is present at a predetermined distance from the scanning device. The scanning device may be responsive to ambient visible or invisible radiation from the label. Each label includes unique identification data for the object/vehicle as well as spaced framing signals used for making distance determinations. Each label may be invisible and may be on or in the windshield of a vehicle.

The signals from the scanning device are sampled continuously and the sampled signals are stepped along a shift register. Parallel outputs from the shift register are continuously analyzed so that signals from a single scan across a label are sufficient to determine if an object/vehicle is at a predetermined distance from the scanning device and to read the unique identification data.

Speed determinations are made by using the change in apparent size of the label to determine when an object/vehicle passes two predetermined distances from the scanning device and measuring the time lapse between the two passing events. The speed and the unique identification of the object/vehicle are both obtained.

20 Claims, 3 Drawing Sheets

REMOTE IDENTIFICATION AND SPEED DETERMINATION SYSTEM

BACKGROUND AND SUMMARY OF THE INVENTION

This invention relates generally to remote object identification and speed determination, and more particularly concerns a system including a novel label on an object as well as novel apparatus and techniques for automatically reading the label at one or more distances. The invention has particular application to the problem of automatically identifying vehicles carrying such labels as well as checking the speeds of such vehicles.

Remote identification systems for vehicles or other objects have been in existence for some years. These systems are often complex and costly devices in which rapid, reliable readings are often not achieved. Some such systems use a television camera to produce an image of a viewing area which includes the license plate on a vehicle. This image is then analyzed to locate the license plate and finally character recognition techniques are used to read the alphanumeric characters on the license plate. Such systems are understandably complex and require expensive equipment to carry out the tasks of first locating the license plate and then reliably and rapidly identifying the moving vehicles. Furthermore, these systems are easily affected by poor lighting conditions. In some systems the license numbers are actually read by human operators after the vehicle license plates have been automatically located and photographed. Of course the use of operators makes the operation even more expensive and time consuming.

Radar devices are often used to measure the speeds of moving vehicles but radar does not attempt to identify an individual vehicle and uncertainty in determining which vehicle is actually being timed can cause costly and time consuming mistakes. According to the present invention the vehicle being timed can be positively identified and confusion between vehicles can be avoided.

A prime object of the invention is to provide apparatus for continuously scanning across a limited area at a predetermined distance into which a bar code label carried by an object or vehicle may move and, in a single scan across the bar code, the apparatus will check to ensure that the total length of the bar code information is detected and also read the information when such a detection is made. Furthermore, the label can be detected if it is located anywhere in the scanned area at the predetermined distance.

It is a further object of the present invention to create a novel label as well as simple and reliable apparatus and techniques for reading such labels from a head-on or other positions by detecting radiation from such labels in daylight or at night.

Another object of the invention is to have the label invisible and transparent so that it can be placed on or in a vehicle windshield and be large enough to be reliably read from a head-on position by an automatic remote reader using only ambient radiant energy and yet, because it is invisible, not obscure the view of the vehicle driver.

Another aspect of the invention is to have a label which is transparent and reflects or emits only invisible radiation so that the label can be placed in the normal line of vision of the driver while driving. Thus the label cannot be covered without also hindering the driving visibility of the driver or making the vehicle easily distinguishable.

Still another aspect of the invention is the use of a bar code label which can be automatically checked for completeness and read on a single line scan across the label.

A further object of this invention is to provide apparatus which positively detects a moving vehicle at least two precisely determined locations so that the speed of the vehicle can be determined by utilizing the lapse of time between the arrival of the vehicle at each of the at least two predetermined locations.

Further objects and advantages of the invention will become apparent from a consideration of the drawings and the following detailed description.

DETAILED DESCRIPTION

Figures 1, 2:
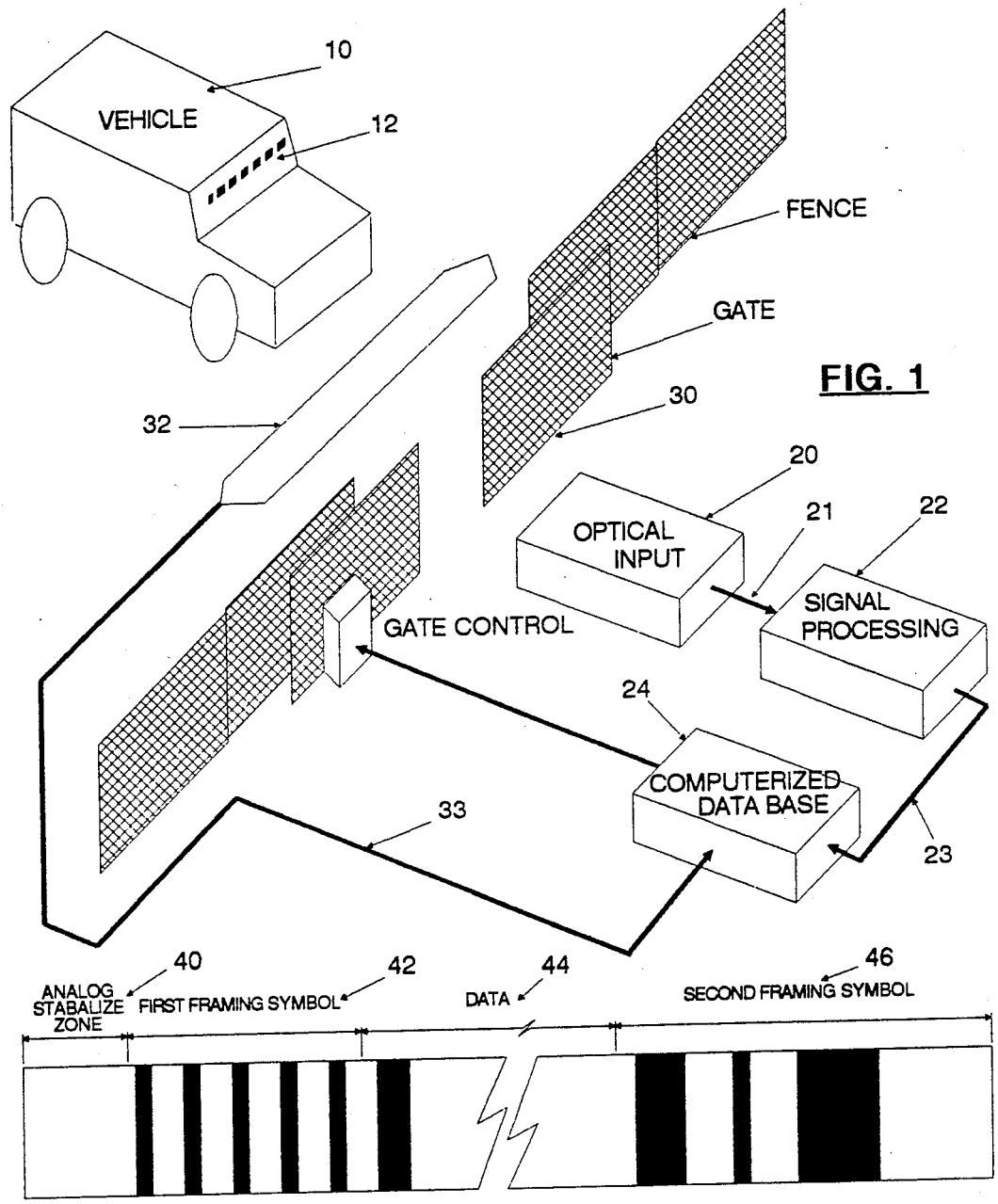
FIG. 1 shows an overall diagram of a first embodiment of the invention being used to identify vehicles.
FIG. 2 shows one embodiment of a remotely readable label as used on the vehicle included in FIG. 1.

FIG. 1 shows an over-all view of one embodiment of the invention used for uniquely identifying vehicles. The windshield of vehicle 10 carries an invisible and transparent label 12 from which ambient invisible radiation is reflected. The radiation may be sunlight, moonlight, starlight or artificial lighting. The radiation frequency used may be chosen from a range of ultra violet to far infrared. One embodiment of such a label will be described in detail below with reference to FIG. 2. Since the label 12 is transparent to the driver of the vehicle, it can be large enough to be reliably and rapidly read at a distance by suitable detecting means without affecting the visibility of the driver. The radiation is detected by an optical input unit 20 which includes, for example, a vidicon tube, a photo diode with lens and rotating mirror, a charge coupled device (CCD), or any other radiation sensitive array. In the embodiment shown in FIG. 1 the optical input unit 20 scans horizontally, head-on across the front of the .PAvehicle and produces a continuous train of signals which include signals representing a scan across a label 12 when such a label is encountered during a scan.

A signal processing unit 22 receives the train of signals from the optical input unit 20 and converts it into a train of binary signals and continuously analyzes this binary signal train to determine when a label of interest is encountered at a predetermined distance from the optical unit. As will be explained with reference to FIG. 2, a label of interest will include at least two framing sections including both a predetermined first framing section and a predetermined second framing section and also a section with vehicle identification data. Circuitry in the signal processing unit is arranged to detect when these at least two predetermined framing sections are encountered and when this occurs, the unique vehicle identification data on the label is read. When the label on the vehicle has been properly read, the identification data is sent to a computerized data base unit 24 where the information can be recorded and/or further processed.

In the embodiment shown in FIG. 1 the system is used, for example, to automatically control the use of rental vehicles. When a particular vehicle has been identified, the data base unit 24 can determine whether a parking lot gate, such as gate 30, should be opened for the exit or entrance of the vehicle. Also the computerized data base unit 24 can, if desired, automatically record the time and date of exit and return of the vehicle and calculate the required rental charges. Of course it can also control the printing, etc. of a vehicle rental bill. Additional optical input units could be used inside the parking lot to automatically control or direct the movement of vehicles inside the lot. Since the optical input unit 20 is relatively simple and inexpensive to construct, a plurality of these units could be used with each of them connected to the same computerized data base unit 24. In addition to, or instead of, gate 30, other means could be used to check on the movement of vehicles. For example a detection loop 32 may be located in the roadway in the path of oncoming vehicles. If a vehicle passes over loop 32 without being properly identified by the signal processing unit 22 and the computerized data base unit 24, then the data base unit can be used to generate a message to tell a central office that an unauthorized vehicle has been detected in the roadway.

One embodiment of label 12 on vehicle 10 is illustrated in FIG. 2. This label may be invisible and transparent. It may be a decal mounted on the inner or outer surface of the vehicle windshield, or it may be abraded into a surface of or embedded in the windshield, for example by lamination. If abrading is used, the abraded portions of the windshield may be filled with transparent material to result in a smooth transparent windshield. In any case the label can be designed so that it cannot be removed from the windshield without essentially destroying the label. It can also be large enough and located so that it cannot be covered without also making driving difficult for the driver or making the vehicle easily distinguishable from other vehicles. As can be seen in FIG. 2, this particular embodiment of label 12 may be laid out in four sections with an analog stabilize section 40 and then a data section 44 sandwiched between two target framing sections 42 and 46. The target framing sections are normally the same for all vehicles of interest while the data section contains unique alphanumeric information for each vehicle with no two vehicles having the same information. Of course, the first framing section on a label may differ from the second framing section on the label if desired. This embodiment of the label has only two framing sections and one data section; of course, the label could include more than two framing sections and more than one data section if desired.

As will be explained below with reference to FIG. 3, the two target framing sections 42 and 46 are read in a single scan across the label to determine if the received signals are coming from a vehicle of interest and also to determine if that vehicle is at a predetermined distance from the optical scanning unit 20. By having at least one framing section scanned before the data and at least another framing section scanned after the data during a single scan across the entire label, one is assured that the entire length of the label has been scanned before the label is accepted as being on a vehicle of interest and also is assured that the scanned label is at a predetermined distance from the optical input unit.

The analog stabilize section 40 may be added to the label to allow the optical input unit 20 to stabilize on an "all white" zone before beginning to read the "black" and "white" in the binary pattern. Since the "white" and "black" portions of the label may both be invisible to the naked eye, the "white" portion is merely a portion of the label which reflects all the light in the .PAinvisible bandwidth being used by the optical unit 20 while the "black" portion absorbs all such light. These names "black" and "white" are entirely arbitrary and merely indicate two contrasting conditions. The names "black' and "white" could be reversed if desired.

The break lines shown in the data section 44 of the label in FIG. 2 indicate that this data section can be of varying length depending upon the application and upon the information to be included in the label.

Since label 12 in FIG. 2 may be transparent and invisible, it also may be quite large and may be located on the windshield directly in the driver's field of vision without impairing the visibility of the driver. This can be useful because the label could not be easily covered without obscuring the visibility of the driver or clearly marking the vehicle. Thus if the vehicle were stolen or intentionally not returned by the customer, its identity could not be hidden by covering the label without also making the vehicle difficult to drive and easily distinguished. Also since the label may be both transparent and invisible it may be large enough to be reliably read at long distances.

Figure 3:
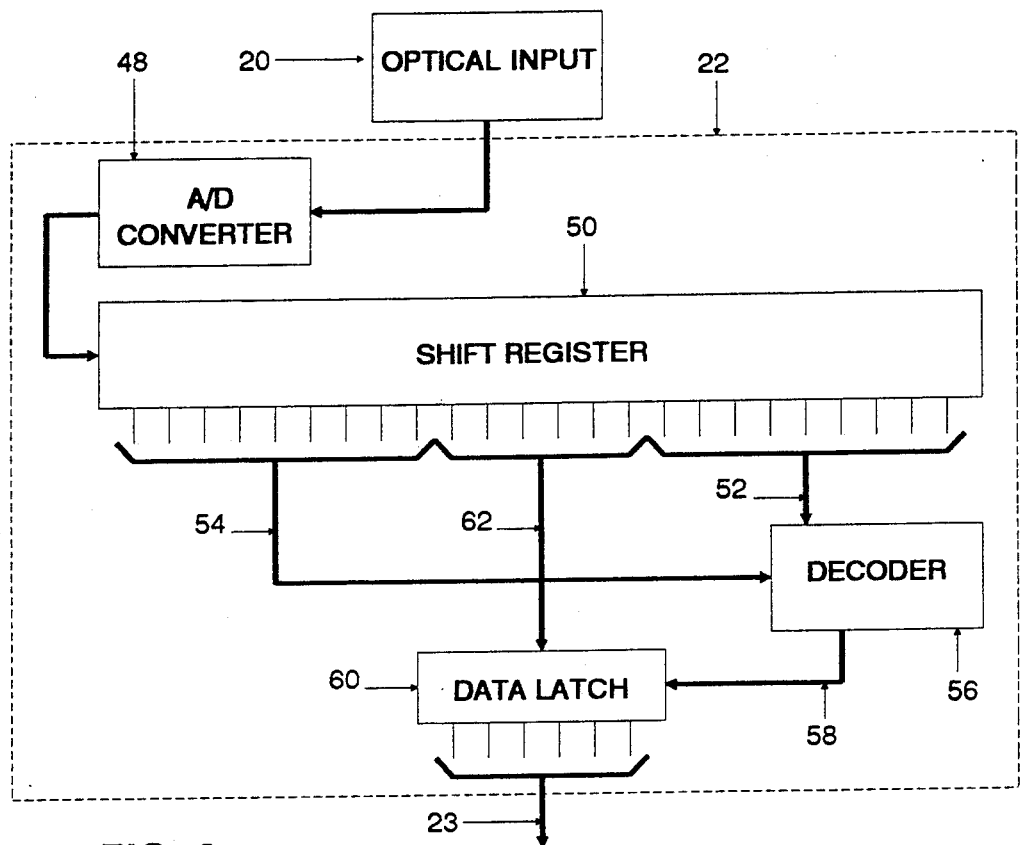
FIG. 3 shows a more detailed block diagram of one embodiment of a signal processing unit for use in the invention.

FIG. 3 shows further details of the signal processing unit 22. This unit receives its input from the optical input unit 20 which continually scans the field of view and produces at its output a continuous analog signal. This continuous analog signal is fed to an analog-to-digital converter 48 which changes the analog signal into a continuous stream of binary signals based on contrasting information received in the analog signal. The A/D converter 48 can include a Schmitt trigger circuit which takes the .PAincoming signal train and squares it up into a train of binary signals which switch between two fixed levels. The binary signals are sampled uniformly in response to clock signals and the sampled signals are sent in serial format to the single serial input of shift register 50. The shift register has a plurality of parallel outputs spaced along the register. As the incoming binary signals are continuously received and uniformly shifted at a predetermined rate along the register 50, the contents of the register is continuously monitored on the register's plural parallel output lines. When the optical input unit 20 receives energy during a single scan across a label such as that shown in FIG. 2, the binary equivalent of the received signal is spread out uniformly along the shift register 50. If the label is at a predetermined distance from the optical input unit, the first part of the signal from the label will be shifted completely to the right end of shift register 50 while the most recently arrived signals from the label will still be at the left end of the shift register.

FIG. 3 also shows that the signals from the first framing part of the label are fed over line 52 (which is actually a plurality of parallel lines) to decoder 56 while simultaneously the signals from the final framing part of the label are being fed over line 54 (again a plurality of lines) to the decoder. Decoder 56 is arranged to detect when a predetermined combination of binary signals is presented to it over lines 52 and 54. Therefore, when the optical input unit 20 scans across a valid label at a predetermined distance from the optical input unit, the detected analog signals corresponding to this scan are converted to binary signals and uniformly shifted across the shift register 50 so that signals from the first target framing section are precisely located at the right end of the shift register and the signals from the final framing section are precisely located at the left end of the shift register. The decoder 56 then checks to see if both framing signals are valid. Of course, if the valid label is not at the predetermined distance from the optical input unit 20, the signals from the label, after conversion to binary format, will not be precisely spread across the shift register 50 and, therefore, a valid label will not be indicated. For example, if the valid label is too far from the optical input unit, the label will appear too small and the binary signals corresponding to the label will not extend across the entire length of the shift register and therefore the plural output lines indicated by lines 52 and 54 will not simultaneously receive signals corresponding to the two framing sections on the label.

Figure 4:
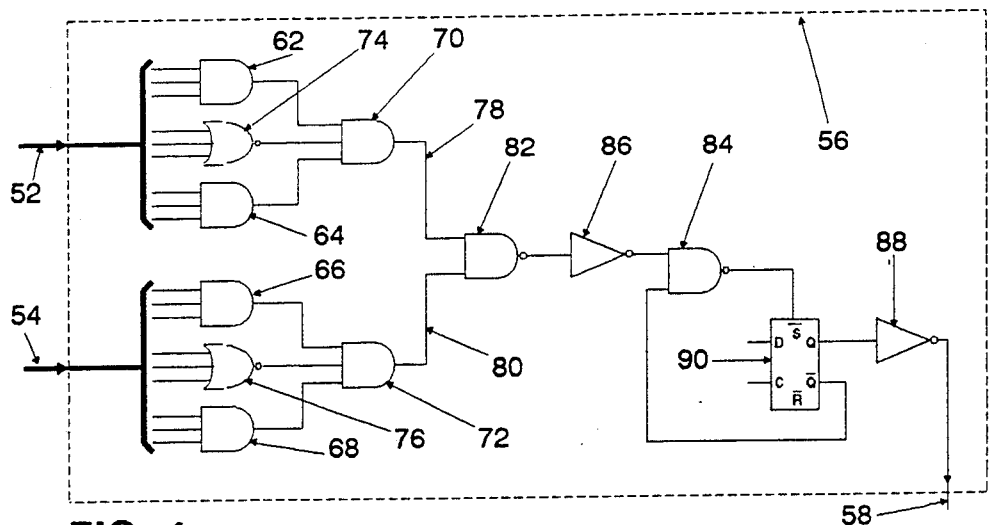
FIG. 4 shows details of one embodiment of a target framing section decoder.

Obviously, decoder 56 can be built in many different ways. One embodiment is shown in FIG. 4 where the decoder is made up of AND gates 62, 64, 66, 68, 70 and 72; NOR gates 74 and 76; NAND gates 82 and 84; inverters 86 and 88; and flip-flop 90. It can be seen from FIG. 3 that when the binary signals corresponding to the first target framing section of the label have shifted to the right end of the shift register, they are output over the parallel lines indicated by line 52. These parallel lines are input into AND gates 62, 64 and NOR gate 74 as shown in FIG. 4. The outputs of these gates are connected to AND gate 70. This combination of gates is arranged so that there is an output from AND gate 70 only when a predetermined combination of binary signals is present on the parallel lines in line 52. Combinations of AND, OR, NAND and .PANOR gates can be chosen to allow the decoder to respond to any desired target framing section on a label. The particular combination of gates 62, 64, 70 and 74 shown in FIG. 4 is arranged to recognize a binary pattern of 111000111. This corresponds to a target framing section composed of black-black-black-white-white-white-black-black-black bars; where "black" and "white" stand for the two contrasting values in the label.

The embodiment of decoder 56 shown in FIG. 4 is also arranged to receive signals from a second framing section which, in this case, happens to be identical to the first target framing section. Of course, the target framing sections on a label need not be identical. The framing sections are there for checking to see that: (1) the vehicle carrying the label is one of interest, (2) the vehicle is at a predetermined distance from the optical input unit, and (3) the entire label has been successfully read in a single scan across the label.

In FIG. 4 the binary signals from the second framing section are received over the plural lines includes in line 54 and are fed to gates 66, 68 and 76. If the signals are valid there is an output from AND gate 72. Therefore if signals from a valid first framing section are present on the lines in line 52 and simultaneously if signals from a valid second framing section are present on the lines in line 54, then AND gates 70 and 72 will both send signals to NAND gate 82 to indicate that a valid label has been detected at a predetermined distance from the optical input unit 20. The signal from NAND gate 82 is inverted by inverter 86 and used to set flip-flop 90 which emits a signal on line 58 to control data latch 60 in FIG. 3. Data latch 60 is arranged to then read and hold the data signals present on the plural data lines included in line 62. The signals on those data lines will then represent the unique identification data for the particular vehicle. Once the identification of the vehicle has been obtained, this information is transferred to the computerized data base unit 24 where it can be used for various purposes. One purpose could be the control of gate 30 shown in FIG. 1.

Figure 5:
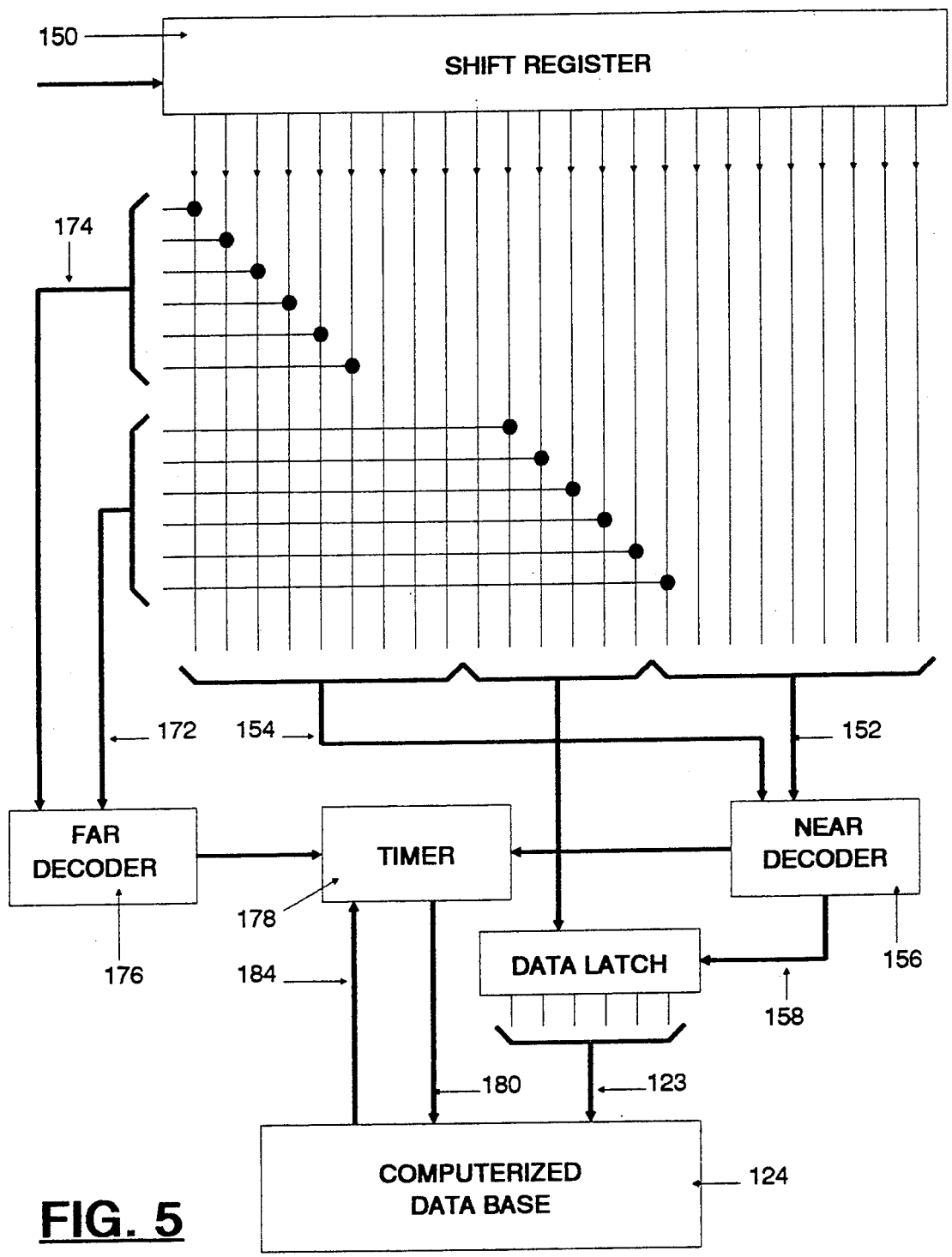
FIG. 5 shows a block diagram of parts of the invention being used to precisely measure the speed of vehicles.

The ability to identify a vehicle and to ascertain its precise distance from the optical input unit makes the invention ideal for measuring the speed of moving vehicles. An embodiment of the invention to be used for vehicle speed surveillance will now be described with reference to FIG. 5. In this embodiment, instead of a single decoder connected to the parallel outputs of the shift register as was shown in FIG. 3, two decoders are used as shown in FIG. 5, a FAR decoder 176 and a NEAR decoder 156. As in the earlier embodiment in FIG. 3, the signals received from the label on the vehicle are converted into a binary string and uniformly moved along shift register 150 shown in FIG. 5. As the label moves closer to the optical input unit, it is repeatedly scanned and the resulting binary signals are continuously fed to the serial input of shift register 150 to be uniformly stepped along the register.

When the vehicle arrives at a first predetermined distance from the optical unit, the binary signals will be precisely spread across the shift register so that the outputs on lines 172 and 174 are decoded by FAR decoder 176 which sends a start signal to timer 178. When the vehicle later arrives at a second predetermined distance from the optical unit, the label will appear larger to the .PAoptical input unit and the binary signals corresponding to the signals received from the label are precisely spread completely across the shift register 150 and the outputs on lines 152 and 154 are decoded by NEAR decoder 156 which sends a stop signal to timer 178. In this way the timer 178 precisely determines the time required for the vehicle to move the distance between the two predetermined distances from the optical input unit 20.

Since this travel distance is known and the travel time has been determined in the timer 178, the speed of the vehicle can be calculated. Thus, a very accurate measurement of speed can be obtained by utilizing the apparent change in size of a known pattern as the pattern is moved toward (or away from) an observer. The time from timer 178 is sent over line 180 to the computerized data base unit 124 where the actual speed calculation (i.e., distance/time) for the vehicle can be carried out. The data base unit 124 can also send a signal over line 184 to reset the timer 178. This speed determination for vehicles can be carried out much more reliably than is done with radar where confusion between various vehicles can occur. According to the present invention, the vehicle being speed checked may be positively identified at each of the two predetermined vehicle positions.

While the invention has been particularly shown and described with reference to particular embodiments thereof, it will be understood by those skilled in the art that various changes in form and details may be made therein without departing from the spirit and scope of the invention.

Thus the scope of the invention should be determined by the appended claims and their legal equivalents, rather than by the examples given.

What is claimed is:

1. Apparatus for measuring the speed of an object which includes a known pattern of known size and shape, said apparatus comprising:
   means to view a field of view through which said object passes;
   means to determine a first point in time when the view of said known pattern, as viewed by said viewing means, appears to be of a first predetermined size;
   means to determine a second point in time when the view of said known pattern, as viewed by said viewing means, appears to be of a second predetermined size;
   means to determine the amount of time between said first point in time and said second point in time; and
   means to calculate the speed of said object which is proportional to said determined amount of time.

2. The apparatus of claim 1, wherein said viewing means includes a scanning means to scan said field of view to produce a train of analog signals which is converted into a train of binary signals which are fed into a serial input of a shift register having plural parallel outputs.

3. The apparatus of claim 1, wherein said viewing means is a scanning means including a two-dimensional array of detecting elements and the object can be detected anywhere in said field of view.

4. The apparatus of claim 1, wherein said viewing means detects said pattern in a radiation frequency range chosen from the spectrum of ultraviolet light to far infra-red.

5. Apparatus for measuring the speed of an object, which object includes a pattern of known size and shape, said apparatus comprising:
   means for repeatedly, linearly scanning across a volume in which said object moves and producing a series of output signals representing the results of said scanning;
   conversion means for converting said series of output signals into a series of binary signals representing the results of said scanning;
   an array of binary storage elements connected in series for receiving said series of binary signals at one element of said array and sequentially storing said series of binary signals;
   stepping means for stepping said stored binary signals across said array of elements in a timed relationship with said received binary signals;
   a first plurality of sampling means connected to a first predetermined set of storage elements in said array for continuously sampling said first predetermined set of storage elements in order to recognize the stored binary signals when they represent a scan across said pattern of known size and shape at a first predetermined distance from the scanning means for determining a first point in time when this first recognition occurs;
   a second plurality of sampling means connected to a second predetermined set of storage elements in said array for continuously sampling said second predetermined set of storage elements in order to recognize the stored binary signals when they represent a scan across said pattern of known size and shape at a second predetermined distance from the scanning means for determining a second point in time when to this second recognition occurs;
   means to determine the amount of time between said first point in time and said second point in time; and
   means to use said determined amount of time to determine the speed of said object.

6. The apparatus for measuring the speed of an object of claim 5, wherein said object is a vehicle, said pattern which that vehicle includes is a bar code which is unique to and identifies that particular vehicle, and at least one of said first and second recognitions includes the recognition of the identity of that particular vehicle.

7. The apparatus for measuring the speed of an object of claim 5 wherein the array of binary storage elements forms a shift register.

8. The apparatus for measuring the speed of an object of claim 7 wherein said first plurality of sampling means are connected to preselected parallel outputs from said shift register and said second plurality of sampling means are also connected to preselected parallel outputs from said shift register.

9. The apparatus for measuring the speed of an object of claim 5 wherein the shape of the known pattern is substantially rectangular.

10. A method of measuring the speed of an object, which object includes a pattern of known size, said method comprising the steps of:
    scanning a field of view through which said object passes to produce a series of images of said pattern;
    determining a first point in time when one of said images of said pattern is of a first predetermined size;
    determining a second point in time when another of said images of said pattern is of a second predetermined size;
    determining the amount of time between said first time point and second time point; and
    determining from said amount of time the speed of said object.

11. The method of measuring the speed of an object of claim 10 wherein said known pattern is substantially rectangular.

12. The method of measuring the speed of an object of claim 10 wherein said known pattern is a bar code.

13. The method of measuring the speed of an object of claim 10 wherein the height and width of the pattern are known.

14. The method of measuring the speed of an object of claim 10 wherein the determined speed is inversely proportional to said determined amount of time.

15. The method of measuring the speed of an object of claim 10 wherein said images of said object are formed from radiation having a frequency range chosen from the spectrum of ultraviolet light to far infra-red.

16. Apparatus for measuring the speed of an object, said object including a pattern of known size, said apparatus comprising:
    scanning means to scan said object to produce a first image of said pattern at a first point in time as the object moves in view of said scanning means, said scanning means continuing to scan said object to produce a series of images of said pattern as the object continues to move;
    means to monitor said series of images to select a second image of said object for determining a second point in time corresponding to when said second image has a size which is a predetermined percentage different from the size of said first image; and means to determine the speed of said object depending upon the time difference between said two points in time.

17. The apparatus for measuring the speed of an object of claim 16 wherein said known pattern is substantially rectangular.

18. The apparatus for measuring the speed of an object of claim 16 wherein the height and width of the pattern are known.

19. The apparatus for measuring the speed of an object of claim 16 wherein said images of said pattern are formed from radiation having a frequency range chosen from the spectrum of ultraviolet light to far infra-red.

20. The apparatus for measuring the speed of an object of claim 19 wherein said known pattern comprises a bar code.

* * * * *